United States Patent
Gornall et al.

(10) Patent No.: US 6,842,252 B1
(45) Date of Patent: Jan. 11, 2005

(54) LASER WAVELENGTH METER

(75) Inventors: William S. Gornall, Fairport, NY (US); Michael T. Houk, Fairport, NY (US)

(73) Assignee: Burleigh Products Group, Inc., Victor, NY (US)

( * ) Notice: Subject to any disclaimer, the term of this patent is extended or adjusted under 35 U.S.C. 154(b) by 301 days.

(21) Appl. No.: 10/069,556

(22) PCT Filed: Nov. 15, 2000

(86) PCT No.: PCT/US00/31429

§ 371 (c)(1),
(2), (4) Date: Feb. 22, 2002

(87) PCT Pub. No.: WO02/40952

PCT Pub. Date: May 23, 2002

(51) Int. Cl.[7] .............................................. G01B 9/02
(52) U.S. Cl. ...................................................... 356/455
(58) Field of Search ................................ 356/451, 452, 356/455

(56) References Cited

U.S. PATENT DOCUMENTS

| | | | |
|---|---|---|---|
| 3,724,959 A | | 4/1973 | Koulicovitch |
| 3,807,029 A | * | 4/1974 | Troeger ........................ 29/436 |
| 3,825,348 A | | 7/1974 | Nomarski et al. |
| 4,052,129 A | | 10/1977 | Schawlow et al. |
| 4,165,183 A | | 8/1979 | Hall et al. |
| 4,319,843 A | * | 3/1982 | Gornall ....................... 356/455 |
| 4,383,762 A | * | 5/1983 | Burkert ....................... 356/455 |
| 4,426,155 A | * | 1/1984 | Monchalin ................... 356/452 |
| 4,654,530 A | | 3/1987 | Dybwad |
| 4,815,855 A | | 3/1989 | Dixon |
| 4,915,502 A | | 4/1990 | Brierley |
| 5,066,990 A | | 11/1991 | Rippel |
| 5,220,463 A | | 6/1993 | Edelstein |
| 5,243,404 A | | 9/1993 | Yoshikawa |
| 5,583,638 A | | 12/1996 | Cutler |
| 6,124,929 A | | 9/2000 | Weibel |

OTHER PUBLICATIONS

J.J. Snyder, Laser Wavelength Meters, Laser Focus May 1982, pps. 55–61.

Lucas Aerospace, Free Flex Flexural Pivot Engineering Data, 1991.

* cited by examiner

Primary Examiner—Gregory J. Toatley, Jr.
Assistant Examiner—Patrick Connolly
(74) Attorney, Agent, or Firm—Martin Lukacher (57) ABSTRACT

A long life laser wavelength meter is based on a Michelson interferometer with a flexure scanner. The scanner has a bar, preferably balanced about a pivot axis defined by a flexural pivot which supports the bar. Retroreflectors are mounted on the bar, equally spaced from the pivot axis. Long life is obtained by cycling or oscillating the bar over a limited range of angular movement within the bending limits of the flexure, which obtains a predicted, essentially infinite cycle life of the flexure. A large optical path length change for each scan of the oscillating bar is obtained through the use of the retroreflectors which fold the optical paths of each arm of the interferometer before reaching a fixed end mirror. The end mirror directs each optical path back through the same set of optical components, including the retroreflectors, to a beamsplitter which combines the light beams from both paths creating an optical interference beam output to a detector. Wavelength measurements are based upon the use of a reference light beam of accurately known wavelength and an input light beam of unknown wavelength that is to be measured. The reference beam and input beam transverse identical optical paths in the interferometer, to a measurement system which separately detects intensity fringes created by interference of the reference and input beams. By providing input and reference beams which are coincident and which traverse identical paths systemic errors during scanning are substantially eliminated. Changes in optical path length greater than 100 mm are obtainable in a compact interferometer.

24 Claims, 9 Drawing Sheets

LASER WAVELENGTH METER

The present invention relates to laser wavelength meters which measure the wavelength of an input beam of unknown wavelength with respect to a reference beam of known wavelength. More particularly, the invention provides a long life laser wavelength meter based on a Michelson interferometer with a flexure scanner. A wavelength meter provided by the invention features a large optical path length change through the use of a flexure which cycles over short distances within the specified bending range of the flexure. Such short cycle distances lead to long and practically infinite cycling life without damage to the flexure. The interferometer does a not rely on rolling or rotary bearings, but rather on flexures operable over short cycle distances or for long life, even in continuous operation.

Short cycle distances requisite for long flexure life are inconsistent with large optical path length change which is necessary for high accuracy wavelength meters. A large number of interference fringes (large change in the order number of the interferometer) for the input beam and the reference beam is necessary to make highly accurate wavelength measurements. Reference may be had to an article entitled "Laser Wavelength Meters" by J. J. Snyder which appeared in "Laser Focus" magazine for May 1982, pages 55 to 61, for information as to the relationship between optical path length change and the accuracy of the wavelength measurement.

In order to obtain requisite optical path length changes in an interferometer wavelength meter, linear scanners such as in the double arm linear bearing interferometer having movable retroreflectors shown in Gornall, U.S. Pat. No. 4,319,843, issued Mar. 16, 1982, may be used. Rotating mirror scanners such as a double arm rotary bearing interferometer described in Cutler, U.S. Pat. No. 5,583,638, issued Dec. 10, 1996 have also been suggested. Interferometers utilizing flexures have not achieved the long optical path length change needed for accuracy in wavelength measurements, let alone long life. Reference may be had to Normarski, et al, U.S. Pat. No. 3,825,348, issued Jul. 23, 1974 in which flexure mounted mirrors are used, but which are limited in path length change to the short distance over which the flexure deflects.

A wavelength meter provided by the invention magnifies the optical path length change relative to the deflection of the flexure. A bar is actuated to deflect about a pivot axis defined by a flexural pivot which supports the bar. A retroreflector is mounted on the bar spaced from the pivot axis, which may be associated with one or more fixed retroreflectors. The bar and retroreflectors magnify the optical path length change relative to the flexural displacement of the bar in that the length of an optical path which extends between the retroreflectors and a fixed mirror from which the optical beam is returned changes as the bar is oscillated about the flexural pivot.

The optical path length magnification by means of the bar and retroreflectors, engenders the requirement for accurate wavelength measurement that the same large path length change is produced during the scan for both the input bean and the reference beam. In accordance with the present invention, the beams are caused to traverse identical paths and are separately detected so as to extract wavelength information from the fringes of each beam as they interfere. More particularly, the beams are propagated simultaneously or samples of each beam propagate successively along the same path via the retroreflectors and the fixed mirror and the change in path length as the bar oscillates is identical for the input and for the reference beams. Interference is then directly a function of the wavelength of the beams and errors due to inconsistent path length changes during the scan are eliminated.

Accordingly, it is an object of the present invention to provide an improved Wavemeter® (a trademark of Burleigh Instruments Inc.) laser wavelength meter.

It is a further object of the present invention to provide an improved laser wavelength meter utilizing a flexure instead of linear or rotary bearings.

It is a still further object of the present invention to provide an improved scanning laser wavelength measurement interferometer, in which an input beam and a reference beam are used and the wavelength measurement is based upon the accurately known wavelength of the reference beam, wherein a large optical path length change sufficient for accuracy in wavelength measurement is obtained where the change in path length accompanies the cycling or oscillation of a flexure.

It is a still further object of the present invention to provide an improved laser interferometer wavelength meter wherein wavelength is measured through the use of separate interference of an input beam and a reference beam wherein the beams traverse the same optical path via a retroreflector which oscillates over an arc and which path is folded at a fixed end mirror.

It is a still further object of the present invention to provide an improved interferometer based wavelength measurement interferometer in which an optical path length change of at least 100 mm is obtained via a flexure based mechanism and without the need for rotary or linear bearings.

Briefly described, an interferometer for measurement of the unknown wavelength of an input beam with respect to the known wavelength of a reference beam embodying the invention utilizes a flexural pivot bearing defining a pivot axis for an oscillating bar, and the bar has a retroreflector spaced from the axis. The bar is oscillated with respect to a fixed mirror having a reflecting surface spaced from the bar, which surface is parallel to the bar when the bar is in a position intermediate at the ends of its range of oscillation. Optics associated with the fixed mirror and the retroreflector, which oscillates about the axis, defines a common path of propagation simultaneously or successively, for the input and reference beams. The beams traverse a path via the retroreflector which is folded at the fixed mirror. The optical path executes repeatedly changes in the optical path length as the oscillatory bar pivots about the flexure pivot axis. Measurements are made based upon the interference of part of the input beam after traversing the path with another part of the input beam after it traverses another path. These paths may change length in opposite senses. The other path is provided with an oscillating bar having two sides, separate retroreflectors carried on both sides of the oscillating bar, which may be balanced about the flexural pivot axis. The input beam and reference beam may be split and travel over two identical paths (constituting the arms of the interferometer) which vary in length in opposite senses as the bar oscillates. The input and reference beams both travel along both of the paths and are combined into an output beam where interference occurs for both beams separately and fringe measurements are carried out to determine the wavelength of the input beam with respect to the wavelength of the reference beam.

The foregoing and other objects, features and advantages of the invention, as well as presently preferred embodiments thereof, will become more apparent from a reading of the following description in connection with the accompanying drawings wherein.

Figure 1:
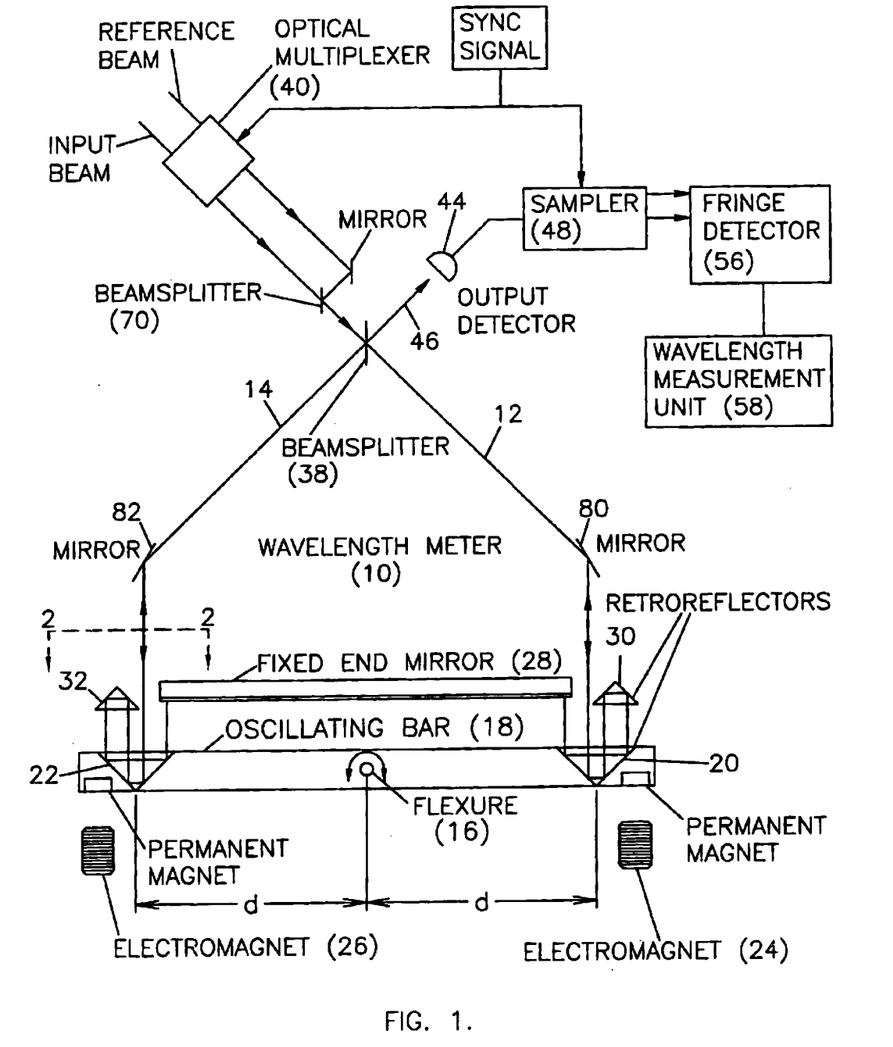
FIG. 1 is a schematic diagram of a laser wavelength measuring, scanning interferometer for measuring the wavelength of an input beam with respect to a reference beam, wherein scanning is supported by a flexural pivot bearing.

Referring to FIG. 1, there is shown a Michelson interferometer based laser wavelength meter 10 that can achieve greater than 100 mm in optical path length change, without the use of rolling or sliding bearing scanners. The paths are in the arms 12 and 14 of the interferometer, and the lengths of the path in arm 12 changes in a sense opposite to the path length change in arm 14. Motion during the scan is achieved using a flexural pivot bearing 16 which mounts an oscillating bar 18. This bar 18 may be in the form of a plate having retroreflectors 20 and 22 carried near the ends thereof. The retroreflectors have their centers, or center axis through the apex of the retroreflectors 20 and 22 spaced at equal distances (d) from the pivot axis of oscillation of the bar 18. One of the retroreflectors 20, is in the arm 12 of the interferometer. The other retroreflector 22 is in the other arm 14.

For long life, the flexure 16 operates within its bending limits. According to manufacturer's specifications, such flexures then have extremely long life which the manufacturer's specification indicates is infinite cycle life; thus the flexures can reliably support an infinite number of oscillation cycles reliably, without failing. The flexure is preferably a flexural pivot bearing of the type described in Troeger, U.S. Pat. No. 3,807,029, issued Apr. 30, 1974. This bearing is commercially available from Lucas Aerospace Power Transmission Corporation of Utica, N.Y. and is called their Pre-Flex Flexural Pivot.

The oscillating bar is balanced about the pivot axis defined by the flexure 16. The oscillations are maintained by electromagnetic actuators 24 and 26 made up of coils which are magnetically coupled to permanent magnets carried near the ends of the oscillating bar 18. Thus the bar 18 is supported in balanced condition by the springs in the flexure 16 without having any need to make contact with the actuating mechanism 24 and 26.

The arms are terminated by a fixed end mirror reflector 28 which has its reflecting surface parallel to the oscillating bar 18 and perpendicular to the center axis of the retroreflectors 20 and 22, when the oscillating bar 18 is in its quiescent condition, which is at the center of its angular range of oscillation. The fixed end mirror is preferably provided by a reflecting surface on a plate, which facilitates alignment of the reflecting surface with respect to the oscillating beam. However, separate fixed end mirrors may be used. The fixed end mirror 28 is a mirror which defines the ends of the arms 12 and 14 and folds the optical beams that traverse the optical paths constituting the arms 12 and 14.

The retroreflectors 20 and 22 are opposed to fixed retroreflectors 30 and 32, which are smaller in cross section radially across their central axis to the apexes thereof than the retroreflectors 20 and 22. The retroreflectors 20, 22, 30, and 32 may be corner cube reflectors. These corner cube reflectors are preferred for ease of alignment. The interferometer provided by the invention is operative without the smaller reflectors. The interferometer, embodying the invention, having only two retroreflectors which are carried on the balanced oscillating bar 18 is described in detail in connection with FIG. 8 hereinafter.

Figure 2A:
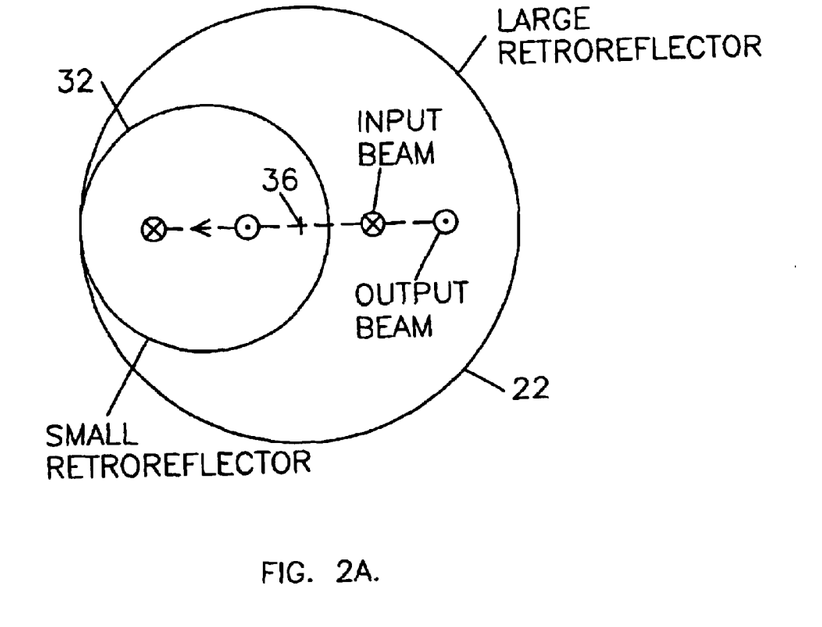
FIGS. 2A and 2B are plan views of the fixed and movable retroreflectors, the views being taken along the lines 2—2 in FIG. 1 showing paths of the light beams as they traverse the fixed and oscillatory retroreflectors.
Figure 2B:
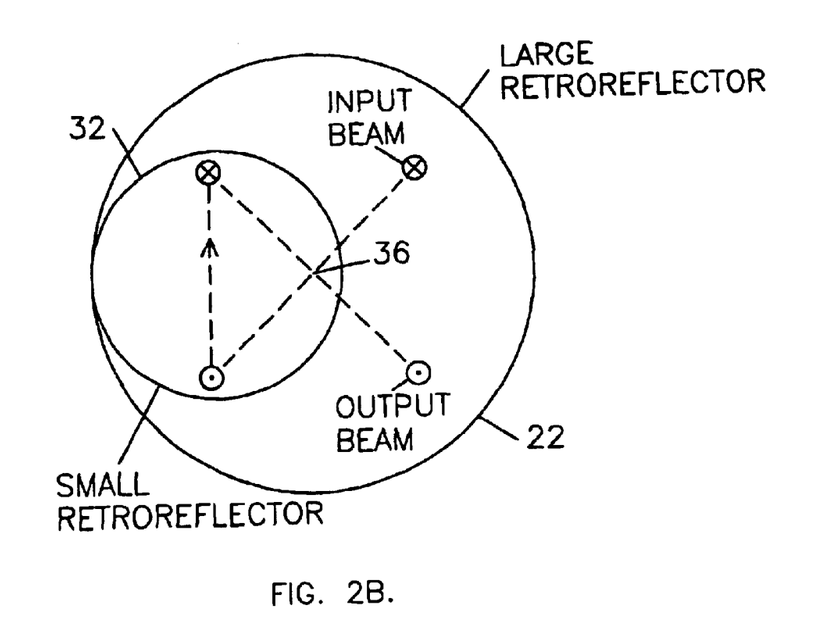

Two possible alignments of the small retroreflector with respect to the larger retroreflector are illustrated in FIGS. 2A and 2B. This alignment is shown for the retroreflectors 22 and 32 in arm 14 on the left side of the flexure 16. The other arm 12 has the retroreflectors 20 and 30 in mirror image relationship to the retroreflectors 22 and 32. In FIG. 2A the input beam to the large retroreflector 22 is on the axis joining the diametrical center 36 of the large retroreflector 22 and the diametrical center of the small retroreflector 32, resulting in an output beam positioned on the same axis. In FIG. 2B the input beam to the large retroreflector 22 is displaced from the axis joining the diametrical center 36 of the large retroreflector 22 and the diametrical center of the small retroreflector 32, resulting in an output beam displaced by an equal amount on the opposite side of the axis. FIG. 2B is the preferred alignment for best separation of the input and output beams. When used as a laser wavelength meter, two beams, namely an input beam of unknown wavelength and a reference beam of accurately known wavelength enter the arms 12 and 14 at a beamsplitter 38. It will be appreciated, of course, that the interferometer may be used for interferometric measurements on a single beam and other than as a laser wavelength meter. When the input and reference beams are used, they must pass through the arms along the same optical path and in coincidence with the path and with each other.

Figure 3:
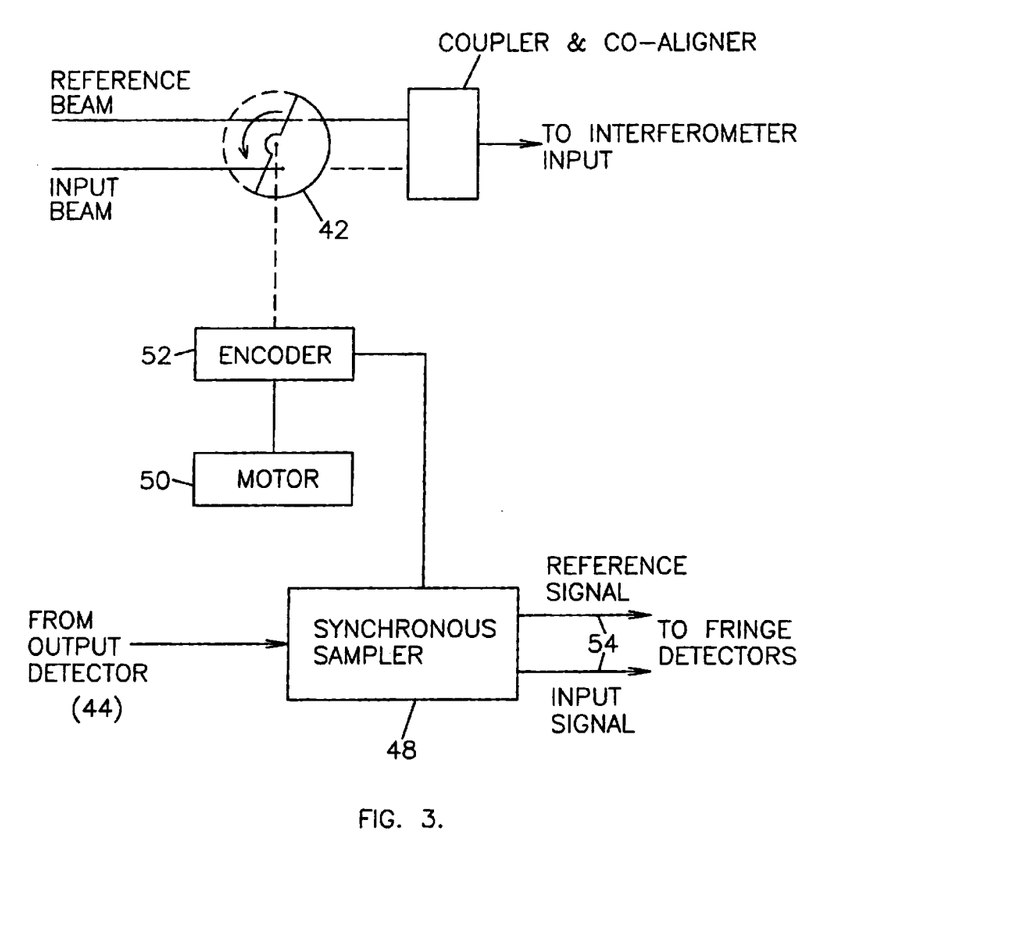
FIG. 3 is a schematic diagram illustrating a system for multiplexing the reference and input beams so that samples thereof are transmitted successively along the same path in the interferometer shown in FIG. 1 and also for synchronously detecting the samples to derive output interference signals from the interfering input and reference beams for making wavelength measurements.

FIG. 1 illustrates the use of an optical multiplexer 40 which may be implemented by a mechanical chopper or shutter 42 as shown in FIG. 3 or an electro-optic shutter which changes the intensity or changes the polarization of the reference beam with respect to the polarization of the input beam. When multiplexed, the input beam and reference beam are launched toward the beamsplitter 38 and introduced into the arms 12 and 14 coincident with each other and along the optical path in these arms as successive samples of the beams.

Figure 4:
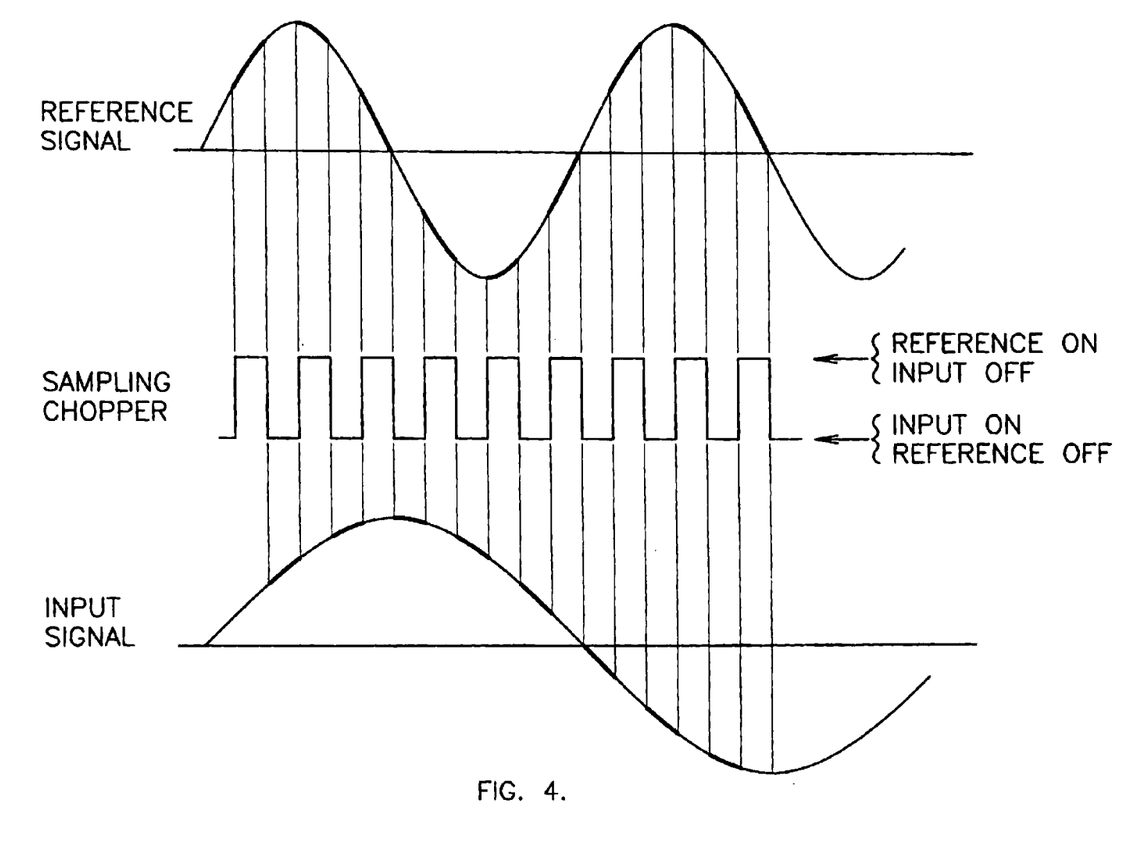
FIG. 4 are waveforms illustrating synchronous detection of the reference and input beams, when they are multiplexed and propagate successively in the interferometer of FIG. 1, and also the fringe signals resulting from the interference of the reference beam and the input beam, respectively.

Interferometric measurements are made by a system utilizing an output detector 44 which may be a photoelectric detector which translates the optical signals, after recombination at the beamsplitter 38 and interference in an output path 46, into electrical signals. These signals are sampled or demultiplexed in synchronism, with the multiplexing thereof by the multiplexer 40, to reconstitute the signals. The signals that are detected are fringes resulting from interference of the input beam after traversing the arms 12 and 14 and returning the output 46. Likewise, similar fringes occur at the output 46 from the interference of the reference beam returned from each of the arms 12 and 14. The returned reference beams, like the returned input beams, are combined and interfere in the output path 46 and are detected by the detector 44. The interference fringes from the reference beam result in the electrical reference signal and are shown in the upper most waveform of FIG. 4. The interference fringes from the input beam result in the electrical signal shown in the lower most waveform of FIG. 4. The successive samples at the output of the multiplexer 40, for example, the chopper 42, occur on opposite phases of the cycle of rotation of the chopper as shown in the center waveform in FIG. 4. These samples are recovered and define the fringes. The periodicity of the fringes is a function of the wavelength of the interfering beams.

The multiplexing may be carried out by a sampler 48 which is synchronized by the same sync signal as the multiplexer 40. In the case of the use of a chopper 42 as shown in FIG. 3, a motor 50 which rotates the chopper has an encoder 52 on the shaft thereof which is connected to a semicircular disk which provides the chopper 42. This encoder provides the sync signal which is applied to the synchronous sampler 48 which provides the samples of the fringes due to the interference of the reference beam at the output and the fringes due to the interference of the input beam at the output. These samples are respectively transmitted over separate lines 54 to a fringe detector 56 which is coupled to a wavelength measurement unit 58. The wavelength measurement unit may be constituted of logic elements as described in the above referenced Gornall patent or by sampling the input beam laser fringe signal once in each cycle of the reference laser fringe signal and taking the fast Fourier transform (FFT) of the sampled data. A computer program which handles the data may then provide an output which, like the hard logic used in the Gornall patent, is a measurement of the wavelength of the input beam with respect to the reference beam wavelength. The fast Fourier transform approach is described in U.S. Pat. No. 4,654,530, issued to Dybwad on Mar. 31, 1987.

Figure 5:
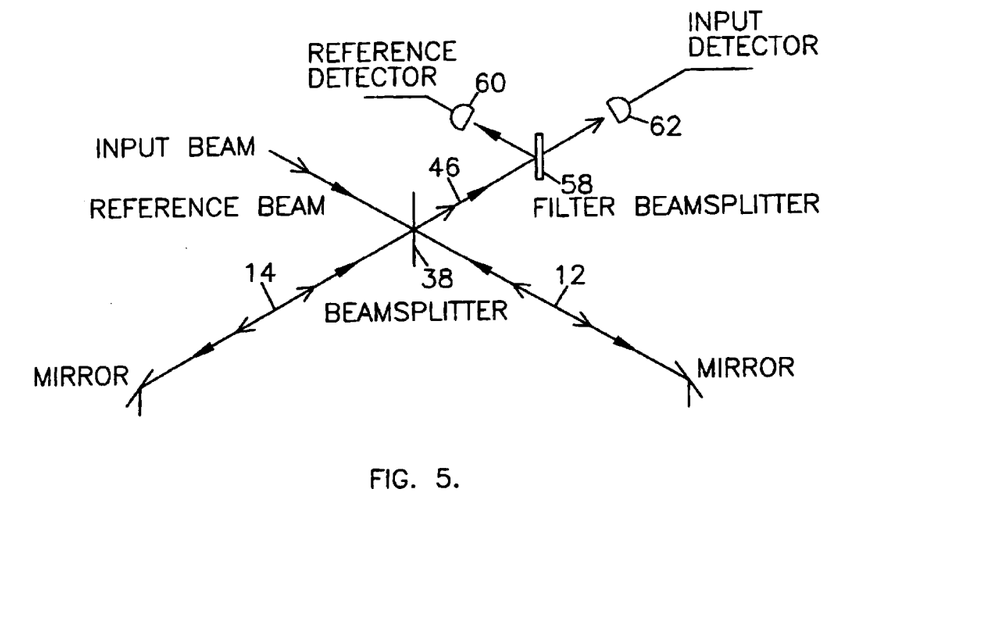
FIG. 5 is a schematic diagram illustrating optics separating the input and reference beams having different wavelengths at the output end of the interferometer of FIG. 1, using a filter beamsplitter.

The use of optical multiplexing of the input and reference beams is preferred when the beams are relatively close in wavelength, say within 250 nanometers (nm). When the beams are relatively far apart in wavelength, for example, when the input beam is at a wavelength in the infrared and the reference beam is in the visible (say from a He—Ne laser), the beams may be transmitted simultaneously and traverse the optical paths in the arms 12 and 14. The interfering returned reference beam and the interfering returned input beam may then be separated by a filter beamsplitter 58 and directed to two detectors 60 and 62 for the reference and input beams, respectively. (See FIG. 5).

Figure 6:
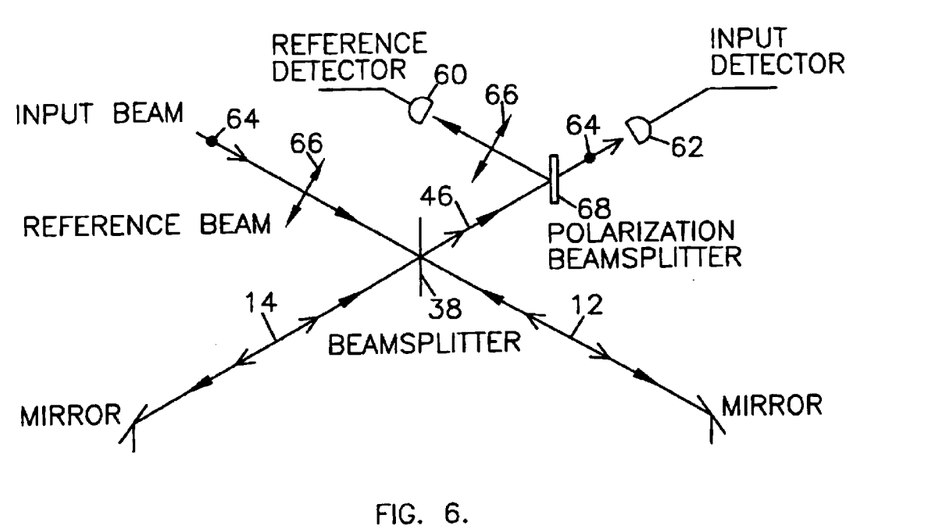
FIG. 6 is a schematic diagram similar to FIG. 5, showing optical separation of orthogonally polarized input and reference beams at the output end of the interferometer of FIG. 1, using a polarization beamsplitter.

As shown in FIG. 6, the input and reference beams may be transmitted coincidentally and simultaneously along the optical paths in the arms 12 and 14 as orthogonally polarized (as shown by the dot and arrows 64 and 66). A polarization sensitive beamsplitter 68 separates the beams, which interfere, in the output section 46.

Figure 7:
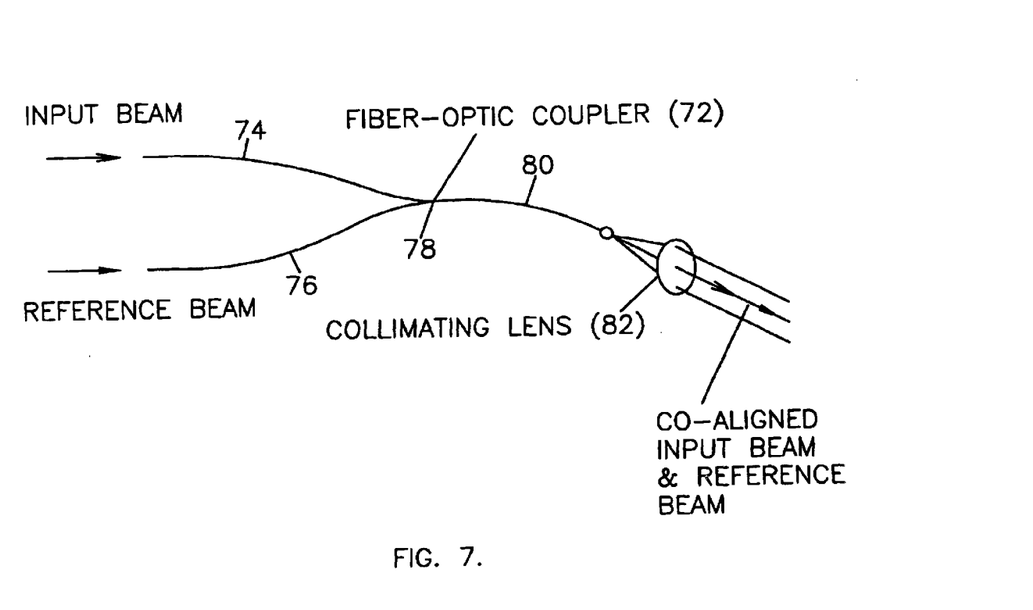
FIG. 7 is a schematic diagram of optics for combining the input and reference beam to travel along identical paths in the interferometer of FIG. 1, which optics may be used alternatively to the beam combining optics shown in FIG. 1.

As shown in FIG. 1, the input and reference beam after optical multiplexing are combined by a coupler provided by a beamsplitter 70. A fiber optic coupler 72 may be used as shown in FIG. 7. The input and reference beams travel through fibers 74 and 76 which are coupled at a junction 78 to a third fiber 80, the light launched from the end of the third fiber is collimated by a lens 82 into co-aligned input and reference beams which are directed to the beamsplitter 38. An optical multiplexer, such as a chopper, may be inserted between segments of the input beam fiber 74 and the reference beam fiber 76 for sampling and transmitting these beams successively into the coupler 72. The multiplexer may be a chopper type shutter as shown in FIG. 3.

Returning to FIG. 1, it will be seen that the beams enter the interferometer from the top left and are split into two paths, constituting the arms 12 and 14, by the beamsplitter 38. In each path the beam reflects in succession off the fixed mirrors 80 and 82 disposed to define the path in the arms 12 and 14, respectively. After reflecting from the fixed mirrors 80 and 82, the beams reflect, in succession, off the larger retroreflectors 20 and 22, the smaller retroreflectors 30 and 32 and once more off the larger retroreflectors 20 and 22. Then the beam in each arm is incident on the fixed end mirror 28. This mirror 28 directs the beam returned from either path back through the same set of optical components in that path through the beamsplitter 38. The fringes are created in output path 46 by interference between the input beam as returned from the arm 12 and from the arm 14, and also between the reference beam as returned from the arm 12 and from the arm 14.

The beams entering and exiting the retroreflectors do not need to be in the same plane as shown in FIG. 2A. Rather the retroreflectors have the property that the reflected beam exits precisely parallel to the beam incident on the surface of the retroreflector, but displaced diametrically across the center 36 of the retroreflector. FIGS. 2A and 2B show two alignments, one when the input or incident beam and the output or reflected beam from the retroreflectors as shown by the circles with crosses and dots in FIGS. 2A and 2B, are in the same plane or across different diameters of the small and large retroreflectors, respectively. The alignment of the retroreflectors is selected in order to minimize cross talk between the incident input and output beams in the retroreflectors.

The large optical path length change obtained from the flexure supported interferometer by virtue of the oscillating bar and the retroreflectors in the two arms 12 and 14, is obtained notwithstanding the limited arc of oscillatory reciprocation, which is within the bending limits of the flexural pivot and is consistent with the long life of the flexure. This arc may be through ±5 degrees. For example, in FIG. 1 the change in optical path length between arms 12 and 14 is $\Delta$ OPL=16 d sin $\Theta$. As noted above, d is the distance between the flexure and the centers (36 in FIG. 2) of the large retroreflectors. $\Theta$ is the angle of oscillation. For d=40 mm and an oscillation arc of ±5 degrees, the optical path length change in FIG. 1 is 100 mm.

Figure 8:
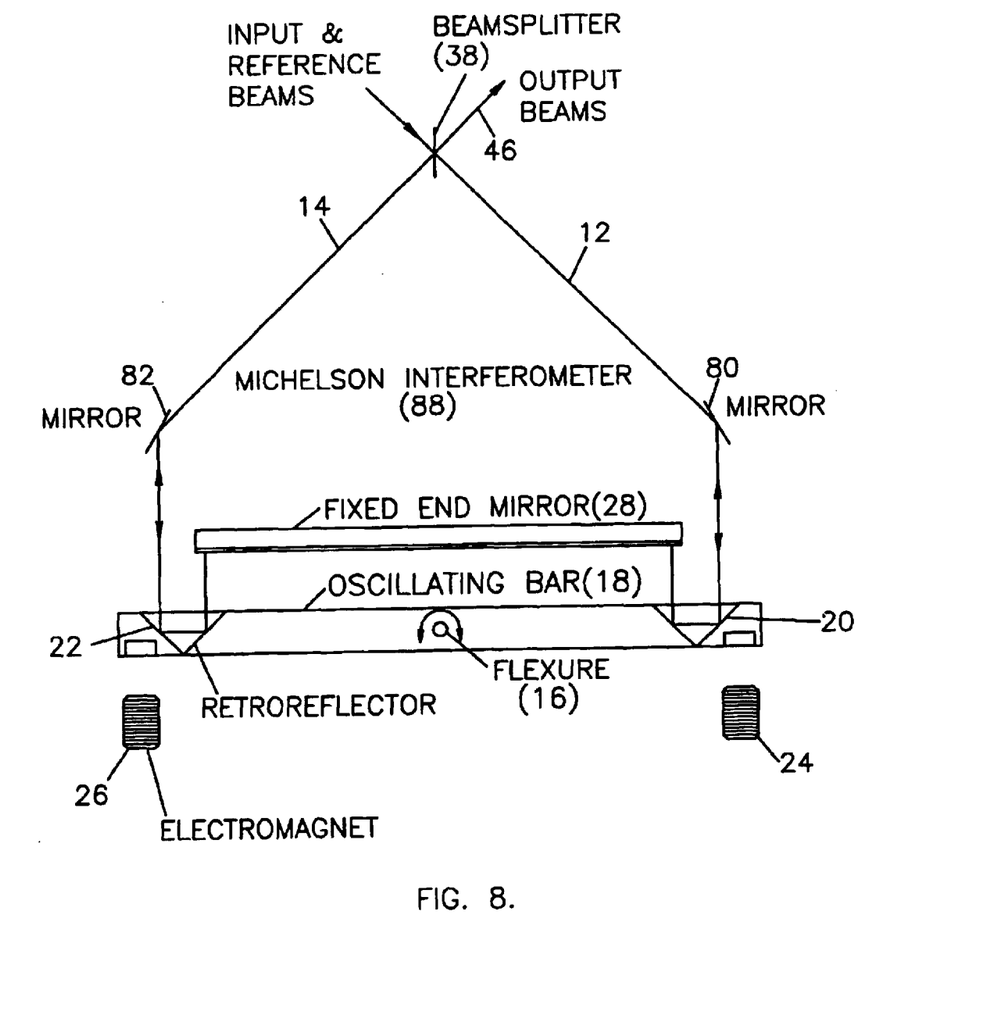
FIG. 8 is a view of a scanning laser interferometer wavelength meter, in accordance with another embodiment of the invention.

Referring to FIG. 8, like parts are identified by the same reference numerals as used in FIG. 1. The design of the Michelson interferometer 88 shown in FIG. 8 is the same in concept as used in the wavelength meter 10 in FIG. 1. The fixed retroreflectors are not used. Then the optical path length change is $\Delta$ OPL=8 d sin $\Theta$. If d equals 40 mm, a deflection of ±10 degrees is needed to produce an optical path length change of 110 mm. This may be accomplished by selecting a suitable flexural pivot bearing which can deflect over the ±10 degree arc and remain within its bending limit.

Figure 9:
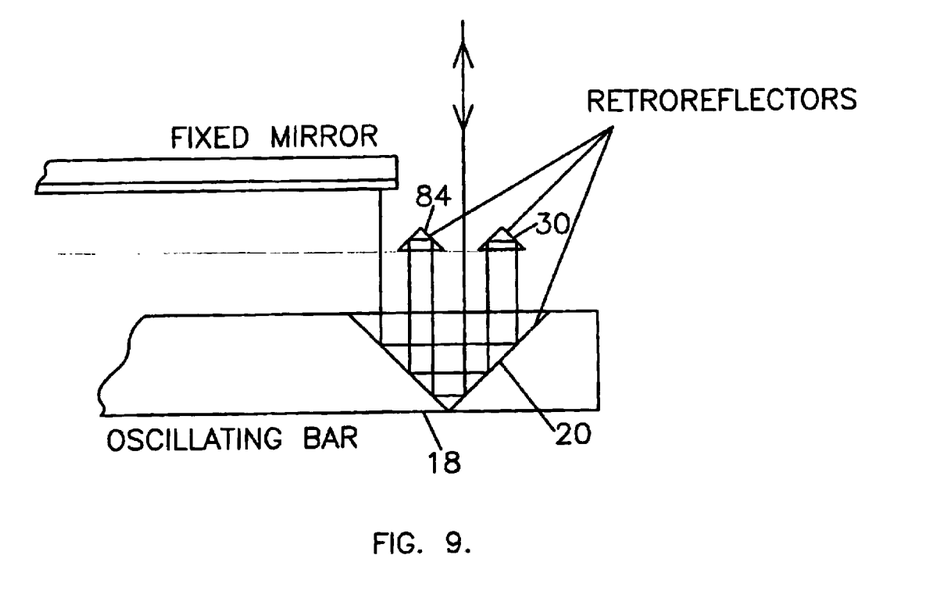
FIG. 9 is a fragmentary view illustrating a retroreflector array including the oscillatory retroreflector and a pair of fixed retroreflectors at one end of the oscillating bar for further magnifying optical path length change in the interferometer of FIG. 1 or FIG. 8, another similar retroreflector array being located at the other end of its oscillating bar.

The path length change in FIG. 1 may be further increased by utilizing additional fixed a retroreflectors on opposite sides of the center axis of the large retroreflector. An arrangement with three retroreflectors, one moving and an additional fixed retroreflector 84 is illustrated in FIG. 9. By adding more retroreflectors in each arm of the interferometer, the relationship between optical path length change and angular motion is magnified to a greater path length change than that shown in the case of the wavelength meter 10 in FIG. 1.

A symmetrical design as shown in FIGS. 1 and 8, utilizing a balanced bar is preferred since the weight of the oscillatory bar 18 is balanced about the center at the flexural pivot, making the deflection of the bar 18 insensitive to gravity. Non symmetrical designs may be used, for example, where one of the arms has a retroreflector mounted on an oscillatory bar and the other arm has a fixed end mirror reflector, as in a conventional Michelson interferometer.

Other variations and modifications of the herein described interferometer wavelength meter, within the scope of the invention, will undoubtedly become apparent to those skilled in this art. Accordingly, the foregoing description should be taken as illustrative and not in a limiting sense.

What is claimed is:

1. An interferometer wavelength meter for measurement of the unknown wavelength of an input beam with respect to the known wavelength of a reference beam comprising a flexural pivot defining a pivot axis, an oscillating bar pivotally mounted on said pivot and having a retroreflector thereon spaced from said pivot axis, means for effecting oscillatory reciprocal movement of said oscillating bar over an arc within the bending limit of said pivot, said arc defining the range of said movement, a fixed retroreflector having a reflecting surface spaced from said oscillating bar and parallel thereto when said oscillating bar is in a position intermediate to said arc, a fixed end mirror presenting a reflecting surface to the beam passing through the moving and fixed retroreflectors and defining an end of a folded optical path, means for defining a common path of propagation for said input and reference beams along a path containing said moving and fixed retroreflectors and turning upon reflection from said fixed end mirror, which path executes repeated changes in length as said oscillating bar executes said reciprocal oscillatory motion about said axis.

2. The interferometer according to claim 1 further comprising a beamsplitter dividing each of said input beam and said reference beam along two paths and recombining said return beams to said measurement making means, and means for making said measurement based upon the interference of said returned input beams and said returned reference beams.

3. The interferometer according to claim 1 wherein said oscillating bar is balanced about said pivot axis and has two sides, each side carrying separate retroreflectors having centers spaced the same distance from said pivot axis, said reflecting surface of said fixed end mirror being opposed to said retroreflectors on said oscillating bar and being perpendicular to said oscillating bar when said bar is in the middle of the range of oscillation thereof.

4. The interferometer according to claim 3 wherein said fixed retroreflectors define said path and are smaller than said retroreflectors on said oscillating bar and are opposed thereto whereby to increase the magnitude of the change in the length of said optical path over the path length change without said fixed retroreflector.

5. The interferometer according to claim 4 wherein said smaller retroreflectors have the centers thereof offset from the center of said larger retroreflectors on said bar, said offset providing spacing of said input and return beams which minimizes cross talk there between.

6. The interferometer according to claim 1 wherein said common path defining means comprises a beamsplitter for reflecting one of said input and reference beams and transmitting the other onto the same, common path.

7. The interferometer according to claim 2 further comprising a filter beamsplitter in the path of said return input and reference beams for separating said beams for application to said measurement making means.

8. The interferometer according to claim 2 wherein said input and reference beams are orthogonally polarized, and means for separating said beams for application to said measurement making means using a polarization sensitive beamsplitter.

9. The interferometer according to claim 2 wherein said common path defining means comprises means for multiplexing said input and reference beams ahead of said beamsplitter so that said input and reference beams are transmitted in samples thereof successively along said optical path, and said measurement making means comprises sampling means for the demultiplexing said returned input and reference beams for separate processing thereof to detect the interference of each of said reference and input beams.

10. The interferometer according to claim 1 wherein said common path defining means comprises first and second fiber optics separately carrying said input and reference beams, said fiber optics being coupled together to provide a common fiber launching said beams into said common path.

11. The interferometer according to claim 10 further comprising means for multiplexing said beams in said fiber optics for launching samples of said beams successively into said common path.

12. A Michelson interferometer having an oscillatory bar, a flexural pivot bearing said bar for oscillation over an angular range of travel within the bending range of said pivot, a retroreflector carried on said bar, a fixed end mirror presenting a reflecting surface to said retroreflector and defining an end of a folded optical path the length of which is repeatedly changed as said bar oscillates, means for projecting an input beam of unknown wavelength and a reference beam of known wavelength simultaneously or successively in coincident relationship along said optical path which is of the same length and undergoes the same change in length with oscillation of said oscillatory bar, and means responsive to interference in said input beam before and after return from said end mirror and interference between said reference beam before and after return from said end mirror for measuring wavelength of said input beam with respect to said reference beam.

13. The interferometer according to claim 12 wherein said reflecting surface is parallel to said oscillatory bar at an intermediate position of said oscillatory bar within said angular range of oscillation.

14. The interferometer according to claim 12 further comprising a detector responsive to interference of said beam, a beamsplitter along said path between said fixed end mirror and said detector.

15. The interferometer according to claim 12 wherein said oscillatory bar has ends on opposite sides of a pivot axis defined by said flexural pivot, said retroreflector being one of a pair of retroreflectors spaced from each other equal distances from said axis.

16. The interferometer according to claim 15 wherein said oscillating bar and retroreflectors are balanced about said axis.

17. A Michelson interferometer having an oscillatory bar, a flexural pivot bearing said bar for oscillation over an angular range of travel within the bending range of said pivot, a retroreflector carried on said bar, a fixed end mirror presenting a reflecting surface to said retroreflector and defining an end of a folded optical path the length of which is repeatedly changed as said bar oscillates and along which path an optical beam is in interfering relationship for wavelength measurement wherein at least one fixed retroreflector is opposed to said retroreflector on said oscillatory bar, said fixed retroreflector is smaller in width than said retroreflector on said oscillatory bar and has a center offset from a center of said retroreflector on said oscillatory bar, said optical beam incident on said fixed end mirror being an incident beam and said beam returned from said end mirror being a return beam.

18. The interferometer according to claim 17 wherein said retroreflectors have a central axis, said central axis of said retroreflectors being aligned in offset relationship with said incident and return beams.

19. The interferometer according to claim 17 wherein a plurality of smaller fixed retroreflectors are disposed with their reflecting surfaces opposing the reflecting surfaces of said retroreflector on said oscillatory bar, and said smaller retroreflectors having central axes offset from the central axis of said retroreflector on said oscillatory beam.

20. The interferometer according to claim 17 wherein said incident and return beams are incident on said retroreflectors generally along a single line intersecting a central axis of said retroreflectors.

21. The interferometer, according to claim 17, wherein said incident and return beams are incident on said retroreflectors along lines which are offset on opposite sides of the line intersecting the central axis of said retroreflectors.

22. The interferometer according to claim 12 further comprising electromagnetic actuator means in proximity to said oscillatory bar for generating magnetic forces perpendicular to said pivot axis to cause flexural oscillation of said oscillatory bar.

23. The interferometer according to claim 12 wherein said spacing of said retroreflectors with respect to said flexural pivot and wherein said retroreflectors are sized so as to define a change in optical path of 100 mm or more as said oscillatory bar moves over said angular range.

24. An interferometer which measures the wavelength of a beam of unknown wavelength with respect to a reference beam of known wavelength which comprises means for propagating said beams simultaneously or successively in coincident relationship and in the same direction along an optical path which undergoes a change in length, and means responsive to interference in said beams for measuring said wavelength of said input beam with respect to said reference beam, wherein said means for propagating said beams comprises an oscillatory bar having at least one retroreflector and a fixed mirror for defining said optical path which undergoes said change in length.

* * * * *